Oct. 29, 1935.  A. PEPPER  2,019,090

RUG DISPLAY RACK

Filed Sept. 5, 1934

Inventor
A. Pepper.
By Thos. H. Johnston
Attorney

Patented Oct. 29, 1935

2,019,090

UNITED STATES PATENT OFFICE 2,019,090

RUG DISPLAY RACK

Abraham Pepper, Pueblo, Colo.

Application September 5, 1934, Serial No. 742,811

4 Claims. (Cl. 211—45)

This invention relates to an improved display rack for throw rugs and seeks, among other objects, to provide a rack adapted to suspend a number of rugs and wherein the rugs may be individually displayed simply by shifting the rugs successively from one side of the rack to the other.

A further object of the invention is to provide a rack which will be compact and thus economize on the use of floor space while, at the same time, the rack will be adapted to display a relatively large number of rugs.

And the invention seeks, as a still further object, to provide a rack wherein the legs thereof may be adjusted for varying the angle at which the rugs are displayed so as to give a better view of the rug patterns, wherein any rug may be readily removed from the rack without removing the other rugs, and wherein the rugs will normally remain neatly in place at all times to present an attractive appearance.

Other and incidental objects of the invention not specifically mentioned in the foregoing will appear during the course of the following description and in the drawing forming part of this application;

In carrying the invention into effect, I employ a stand embodying pairs of legs 10 and 11 which are preferably constructed of angle iron although other suitable material may, of course, be employed and extending transversely between each pair of legs is a vertically spaced pair of parallel stretchers 12 welded or otherwise fixed to the legs. Connecting each pair of legs at their lower ends is a bottom bar 13 also preferably of angle iron. These bars may be welded or otherwise fixed to the legs and appropriately secured to said bars at their ends are suitable casters 14.

Figure 1:
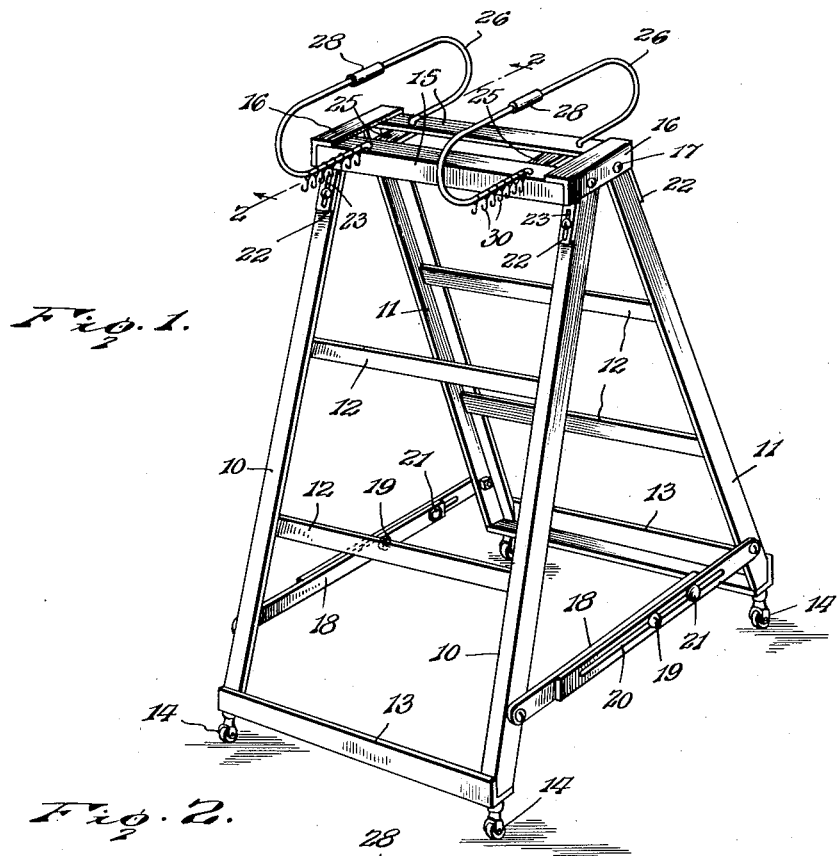
Figure 1 is a perspective view of my improved rack.

Connecting the upper ends of the pairs of legs 10 and 11 with each other is a head including side bars 15 and end bars 16. These bars are preferably of angle iron and, as shown in Figure 1, the end bars are arranged to overlie the ends of the side bars to which they are welded or otherwise fixed. Extending through the side bars and through the upper ends of the legs are bolts or other suitable fastening devices 17 pivotally connecting the legs with the head.

Extending between the lower end portions of the pairs of legs 10 and 11 are overlapping adjusting rods 18 which are preferably flat. These rods are pivotally connected at their outer ends to the legs by bolts or other suitable fastening devices and adjustably connecting the rods are bolts 19, corresponding rods being provided with slots 20 to accommodate said bolts. Preferably, a rivet 21 or like fastening device is also provided to permanently connect the rods of each pair with each other, the rivets being freely accommodated in the slots 20. Thus, by loosening the bolts 19, the pairs of legs 10 and 11 may be relatively adjusted for varying the angle thereof when, upon the tightening of said bolts, the rods 18 will serve to rigidly lock the legs in adjusted position.

Mounted upon the upper end portions of the pairs of legs 10 and 11 are stops 22 and formed in said stops are longitudinally extending slots 23. Extending freely through said slots and through the legs are bolts 24. Thus, after the pairs of legs 10 and 11 have been relatively adjusted, the stops 22 may be adjusted upwardly on the legs to engage the side bars 15 of the head of the stand, as most clearly shown in Figure 2, for rigidly locking the head in horizontal position on the legs. Tilting of the head under an unbalanced load thereon either at one side or the other of the head will thus be effectively prevented.

Figure 2:
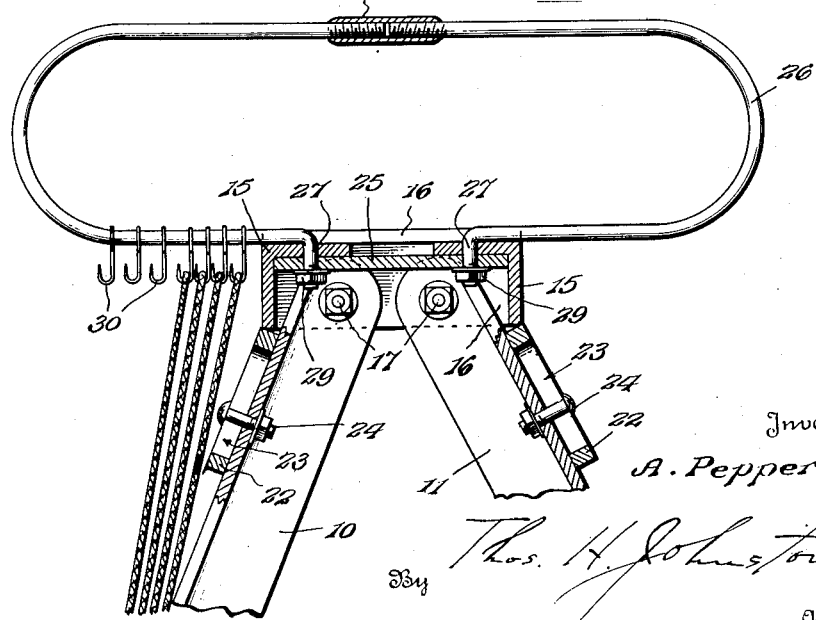
Figure 2 is a fragmentary transverse vertical sectional view showing a number of rugs in position on the rack.

Extending transversely between the side bars 15 of the head near the ends thereof are cross strips 25 welded or otherwise fixed to said bars and mounted upon the head is a pair of upstanding parallel article supporting loops 26 which extend transversely of the head and overhang the head at opposite sides thereof. As best shown in Figure 2, each of said loops is formed of a pair of metal rods shaped to provide companion loop-sections, the rods being bent at corresponding ends thereof to form trunnions 27 and being provided at their opposite ends with right and left threads to receive connecting sleeves 28. As shown, the trunnions 27 extend through the side bars 15 of the head and through the cross strips 25 and screwed on said trunnions are nuts 29 detachably connecting the loops with the head. Slidable freely on the loops 26 is a plurality of suspending hooks 30 bent at their upper ends to provide suitable rings or eyes freely embracing the loop rods.

As will now be seen, a number of rugs may, as shown in Figure 2, be engaged with the hooks 30 to be suspended thereby at one side of the rack and any appropriate number of hooks may be provided so that the rack will thus be adapted to carry a corresponding number of rugs. Small racks will preferably be provided for displaying small rugs while racks of increased size will be used for displaying rugs of larger size. After the outermost rug has been inspected, the hooks supporting said rug may, as will be at once appreciated, be slid along the loops 26 and said rug thus reversed from one side of the rack to hang at the opposite side thereof. The next succeeding rug will then, of course, be displayed and so on until all of the rugs have been individually presented to view. The rugs will, when hanging from the supporting loops 27, of course lie against the pairs of legs 10 and 11 as well as against the stretchers 12 so that by relatively adjusting the pairs of legs, the angle at which the rugs are displayed may be varied and by manipulating the sleeves 28 to free the upper ends of the loop-sections, the hooks 30 may be readily removed from the loops or additional hooks may be installed thereon. It will accordingly be seen that I provide a particularly effective construction for the purpose set forth and in this connection it is to be noted that any one of the rugs may be detached from its suspending hooks without disturbing the other rugs.

Having thus described the invention, I claim:

1. A display rack including a head, legs pivotally connected thereto for relative adjustment and supporting the head to provide a stand, means locking the legs in adjusted position, means adjustable on the legs to engage the head for locking the head against tilting movement on the legs, upstanding loops carried by the head and overhanging the head at opposite sides thereof, and article suspending means carried by said loops and freely movable thereon from either side of the stand to the other.

2. A display rack including a head, legs pivotally connected thereto and supporting the head to provide a stand, stops adjustable on the legs to engage the head at opposite sides thereof for limiting the head against tilting movement on the legs, loops carried by the head and overhanging the head at opposite sides thereof, and article suspending means carried by the loops and freely movable thereon from either side of the stand to the other.

3. A display rack including a stand having a head, rods shaped to provide companion loop sections having trunnions fixed to the head and mating to provide upstanding loops overhanging the head at opposite sides thereof, the free ends of the sections being normally disposed in alignment, means detachably connecting the free ends of said sections and closing the loops at the upper sides thereof, and article suspending means carried by said loops and freely movable thereon from either side of the stand to the other, said trunnions supporting the loop sections for turning movement whereby said sections may be swung to dispose the ends thereof out of alignment when freed by said connecting means.

4. A display rack including side bars connected by end bars to form a head, pairs of legs pivotally connected to said end bars and supporting the head to provide a stand, means carried by the legs and adjustable to engage said side bars for limiting the head against pivotal movement on the legs, upstanding loops carried by said side bars and overhanging the head at opposite sides thereof, and article suspending means carried by said loops and freely movable thereon from either side of the stand to the other.

ABRAHAM PEPPER. [L. S.]